United States Patent [19]

Morgan

[11] 4,152,258
[45] May 1, 1979

[54] VIBRATORY FEEDER

[75] Inventor: John H. Morgan, Syston, England

[73] Assignee: Richards Structural Steel Company Limited

[21] Appl. No.: 827,684

[22] Filed: Aug. 25, 1977

[51] Int. Cl.² .............................................. B07B 4/00
[52] U.S. Cl. .................... 209/471; 209/136; 198/755
[58] Field of Search ............... 198/755, 771, 772; 209/10, 145, 137, 136, 472, 480, 481, 244, 257, 471

[56] References Cited

U.S. PATENT DOCUMENTS

| 1,425,763 | 8/1922 | Goodwin | 209/257 |
| 2,338,954 | 1/1944 | Messerli | 198/755 |
| 2,795,318 | 6/1957 | Morris | 198/771 |
| 2,995,244 | 8/1961 | Schlicksupp | 209/472 |
| 3,955,669 | 5/1976 | Homilius et al. | 198/755 |

Primary Examiner—Robert Halper
Assistant Examiner—Jon E. Hokanson
Attorney, Agent, or Firm—Charles E. Brown

[57] ABSTRACT

A vibratory feeder for conveying particulate material from one level to a higher level comprising an inclined, article-supporting surface, means for vibrating said surface, a plurality of baffles disposed in spaced apart relationship and spaced from the inclined surface with the baffles lying at an angle to the article-supporting surface.

5 Claims, 9 Drawing Figures

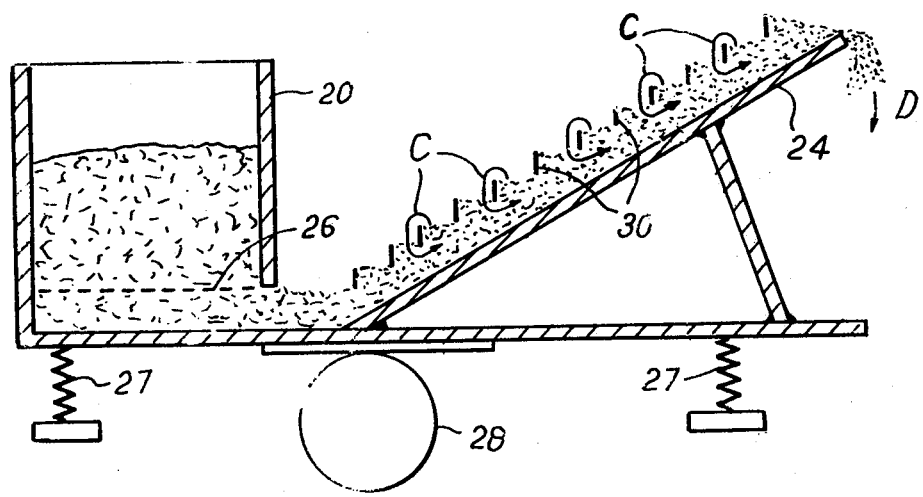
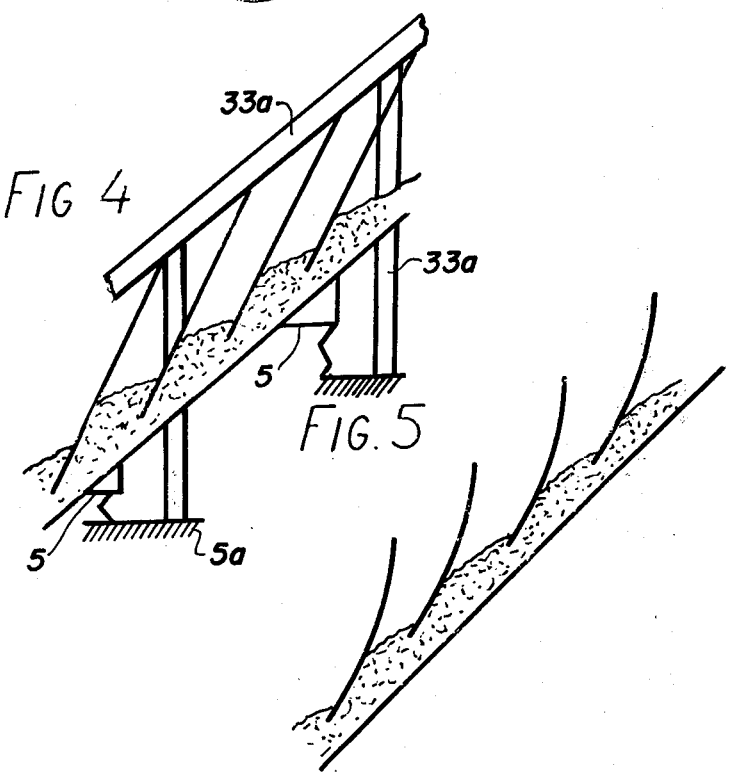

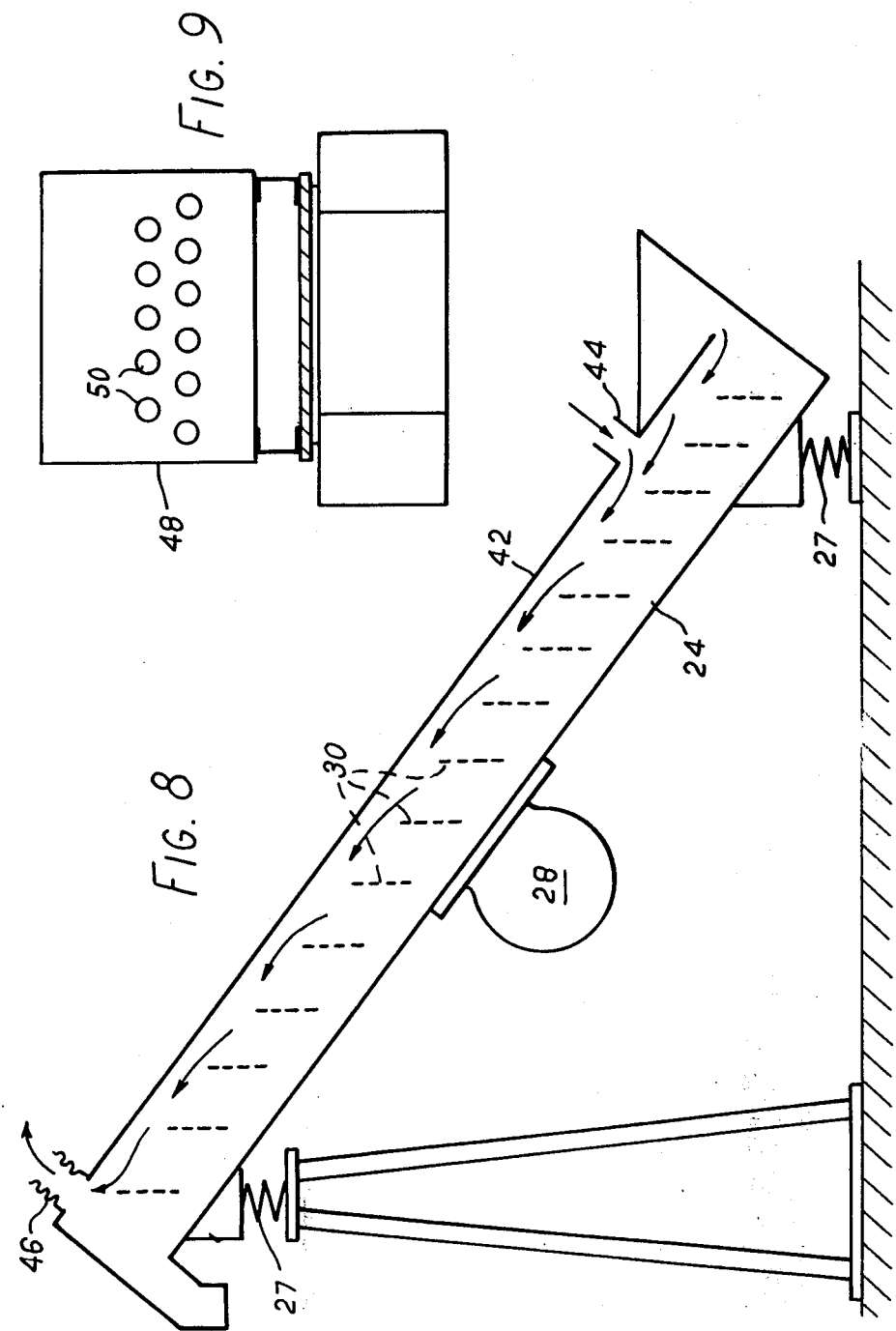

VIBRATORY FEEDER

The present invention relates to a vibratory feeder.

It is known to provide a feeder or conveyor to convey particulate material from one level to a higher level. One known conveyor consists of an endless belt running between two or more rollers, at least one of which is powered, to drive the belt between the two levels so as to raise material placed thereon at the one level to the higher level.

It is a disadvantage of endless belt conveyors that material conveyed by the belt may become lodged in its moving parts leading to a reduction in operating efficiency, increased wear, or even total disablement thereof.

The invention provides a vibratory feeder comprising a resiliently mounted inclined article-supporting surface, means for vibrating said surface, a plurality of baffles being disposed in spaced apart relationship and spaced from the said surface with the baffles lying at an angle to the article-supporting surface.

Preferably, the baffles are parallelly spaced apart. The baffles may be straight, curved or otherwise shaped and each baffle may subtend an acute angle with respect to the inclined surface. Conveniently, the baffles are vertically orientated. If desired, the baffles, may be adjustably mounted to enable the angle subtended with the inclined surface to be adjusted.

Hence, when the feeder is in use and particulate material is being conveyed up the inclined surface particulate material is temporarily stored in the inter-baffle spacing during its passage up the surface.

The baffles may preferably be mounted so that they are attached to a vibratory part of the feeder structure and therefore vibrate in unison with the inclined surface or alternatively they may be independently mounted to a fixed part of the feeder structure so that they remain stationary.

It is believed that the theoretical basis for the invention lies in the combination of the use of vibration and flexible mounting to persuade the structure of the feeder to move in a series of ellipses so generated as to throw particular material lying on the inclined surface forwards and upwards, baffles being provided to restrict backsliding of the material due to the influence of gravity during a return part of the vibratory cycle.

This appears to be due to the fact that whilst the movement of the inclined surface of the feeder is tied to the ellipse generated by the interaction of the or each vibrator motor and the flexible mounting, yet at one point in the vibratory cycle the particles having energy and acceleration imparted by the inclined surface in a lifting part of the vibratory cycle are in fact free agents and are able to continue forward in a trajectory governed only the the force of gravity as the structure of the elements begins the return part of its cycle.

In one embodiment of the invention the baffles are relatively short so that some counterflow of particulate material occurs over the top of the baffles downwardly, i.e. in an upstream direction, as well as in the desired general direction up the inclined surface. In a further embodiment of the invention, the baffles are relatively long so that particulate material is not able to bridge individual baffles and pass into an upstream inter-baffle spacing. The choice as to whether to use short or long baffles for conveying an individual particulate material depends on a number of factors the chief of these being the angle of the baffle with respect to the inclined surface and the amplitude of the vibratory motion.

The means for vibrating the inclined surface may include a single vibrator having a squirrel cage type electrical motor with out-of-balance weights. One or more of any convenient vibrators may be used however.

The vibratory means may be provided at any suitable position on the structure of the feeder a particularly suitable position being a point on the underside of the inclined surface.

The feeder may be made from any suitable material for example mild steel or if the intended use of the feeder is for the handling of foodstuffs or medicines stainless steel may be used for at least those surfaces. It is also envisaged that plastics or plastics covered metal may be used.

The vibratory feeder of the invention has the effect of tending to break down particulate material being conveyed along it, more especially where short length baffles are used. The feeder may be utilised with a container at the lower end thereof, the container serving to at least partly break down solid material prior to its passage up the Feeder. Thus, the feeder of the invention may suitably be used as a part of an apparatus for breaking down solid material into particulate size comprising a resiliently mounted container having a false bottom in the form of a screen, the space below said false bottom communicating with an inclined surface, a plurality of spaced apart baffles disposed in spaced relationship to said inclined surface and means for vibrating said container and inclined surface to induce in material contained therein or placed thereon a substantially saw-tooth pattern of oscillation.

In accordance with another aspect of the invention there is provided a method of feeding particulate material up an inclined article-supporting surface which comprises vibrating said material in a direction generally upwardly of said surface and storing temporarily at least part of said material in inter-baffle spacings provided between a plurality of spaced apart baffles disposed along the length of said surface.

The invention will now be described by way of example with reference to the accompanying drawings in which:

FIGS. 2 and 3 show diagrammatic side views of two types of apparatus for breaking down solid material incorporating a vibratory feeder similar to that shown in FIG. 1;

FIGS. 4 to 6 are side elevations of some alternative baffle arrangements;

FIG. 8 shows an embodiment of the invention suitable for removing fines from a material being elevated, and FIG. 9 shows the use of cooling or heating elements for respectively cooling or heating material being elevated.

Figure 1:
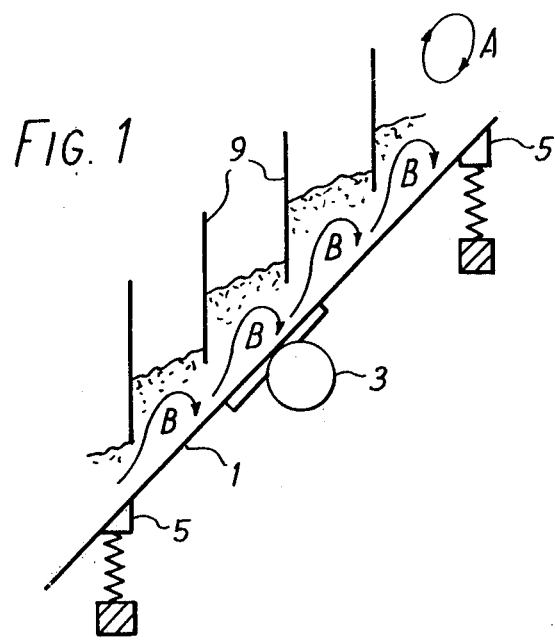
FIG. 1 shows a diagrammatic view of a vibratory feeder in accordance with the invention.

The vibratory feeder shown in FIG. 1 consists of a resiliently mounted inclined wall defining an article-supporting surface 1 in spaced relation to which are mounted a plurality of baffles 9. The baffles 9 are parallelly spaced and vertically orientated thus subtending an acute angle with the surface 1. The baffles are supported in the illustrated position by suitable brackets (9a) which are mounted on the surface 1. The surface 1 is caused to vibrate by a vibrator 3 which consists of a squirrel cage motor with out-of-balance weights, and a pair of resilient Metalastik (Registered Trade Mark) supports 5 mounted on structure 5a. The vibrator 3 is arranged to vibrate the feeder in an oscillatory motion such that any particular point on the feeder describes an ellipse as seen at A. By virtue of this motion particulate material 7, placed on the feeder moves up the inclined surface from a lower region to an upper region thereof where it passes to further distribution or processing stages (not shown).

As may be seen from FIG. 1, as particulate material commences to travel up the feeder, it does so in a series of generally saw-toothed steps identified by arrows B. Hence, the particulate material tends to build up in the inter-baffle spacings. The angle of repose of the material stored temporarily in the inter-baffle spacings is shallower than that of the inclined surface 1 so that the force component tending to slide the particulate material down the surface is reduced.

Figure 2:
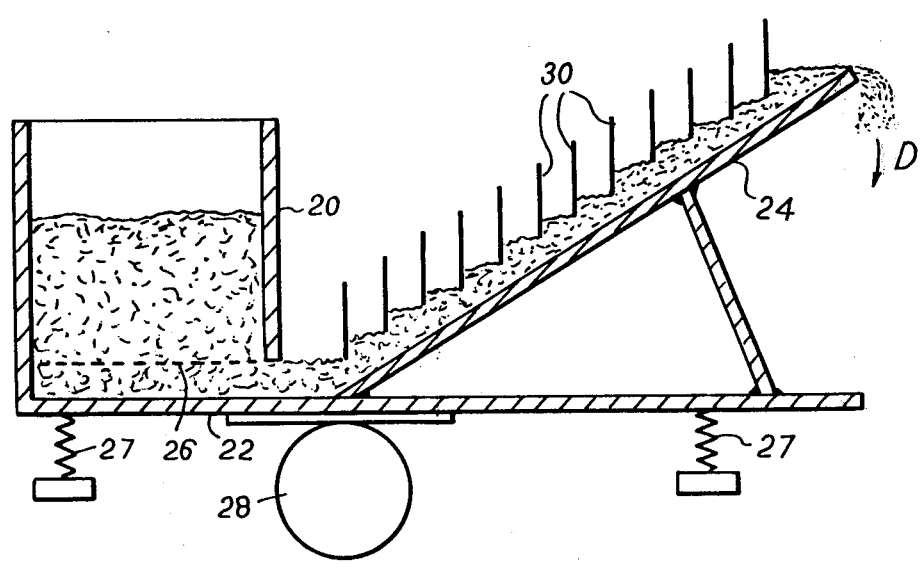

The apparatus shown in FIG. 2 includes a tub or other vessel 20 the bottom 22 of which is extended and has an inclined surface provided by a side wall 24 welded thereto. The tube 20 is provided internally with a screen 26, the wall of the tub below the screen being open to the inclined wall 24. The screen 26 serves to exclude any oversize material fed to the vessel 20 and which may otherwise damage the elevator. The tub 20 and inclined wall 24 are flexibly mounted upon a rigid base, for example of concrete, on resilient supports 27, for example, Metalastik posts. A single vibrator 28 which, in the illustrated example, is a 3-phase squirrel cage electrical motor with out-of-balance weights is mounted on the bottom 22.

A plurality of parallelly-spaced baffles 30 are mounted in spaced relationship to the inclined side wall 24 by means of brackets 30a. The baffles are comparatively long by which is meant that, taken in a direction up the inclined side wall 24, the top of one baffle is higher than the base of the next adjacent baffle.

Solid material to be broken down into particulate size, such as resin-bonded foundry sand, is placed in the tub 20 and vibrated. The particulate material commences to travel up the inclined side wall 24 and quickly settles to a level between baffles as shown. The effect of the baffles is to greatly reduce the quantity of particulate material present at any one time on the wall 24 since, if the baffles were not present a large triangular section of material would tend to build up bounded on two sides by the outer surface of the apertured wall of the tub 20 and the wall 24. The baffles offer the additional advantage that they tend to break the particulate material down still further by collision therewith.

The apparatus shown in FIG. 3 is simiar to that shown in FIG. 2 and similar reference numerals have been used to designate similar parts. It is to be noted however that brackets are used to support the baffles in spaced relation to the plane, the brackets being similar to brackets 9a of FIG. 1. The brackets have been omitted from FIG. 3 for clarity. The difference between the two apparatuses is that the baffles in FIG. 3 are of a shorter length than in FIG. 2. The lowermost level of the particulate material in the inter-baffle spacing between two baffles is higher than the height of the lower baffle.

In this way part of the particulate material being fed up the wall 24 is recirculated in the manner shown diagrammatically by the arrows C, thus giving rise to an inter-particle scrubbing action which assists in particle breakdown, or resin removal in the case of resin-bonded foundry sand.

In the apparatus illustrated in FIGS. 2 and 3 particulate material is discharged from the upper end of the wall 24, as indicated by arrow D. In this connection it will be noted that the discharge position is higher than the height of the tub.

In FIG. 4 the baffles, although straight and parallelly spaced, are not vertically orientated. Instead they subtend a shallower angle with the inclined surface so that less particulate material is stored in the inter-baffle spacings. The baffles shown in FIG. 4 are mounted on supports 33a fixed to the structure on which the elevator if mounted.

The baffles shown in FIG. 5 are curved to enable slightly more particulate material to be stored than is the case where the baffles are straight shown in FIG. 4. The baffles of FIG. 5 are suitably mounted by brackets similar to those of FIG. 4, but have been omitted for clarity.

Figure 6:
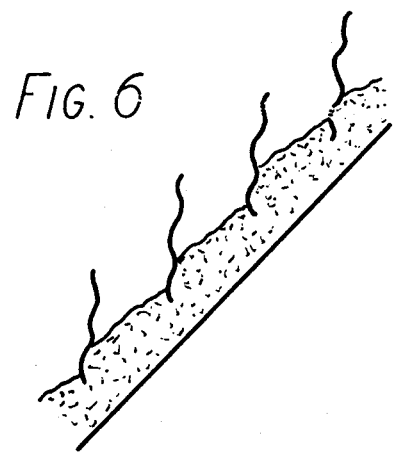

In FIG. 6 the baffles are corrugated to allow for greater baffle strength in wide conveyors. Again, mounting brackets for the baffles of FIG. 6 are similar to those of FIG. 4, but have been omitted for clarity.

Although in the feeder described the vibrator of the feeder structure has so arranged that any point on the feeder structure describes an ellipse it is to be understood that the term ellipse as used in this specification may extend to a circle.

Figure 7:
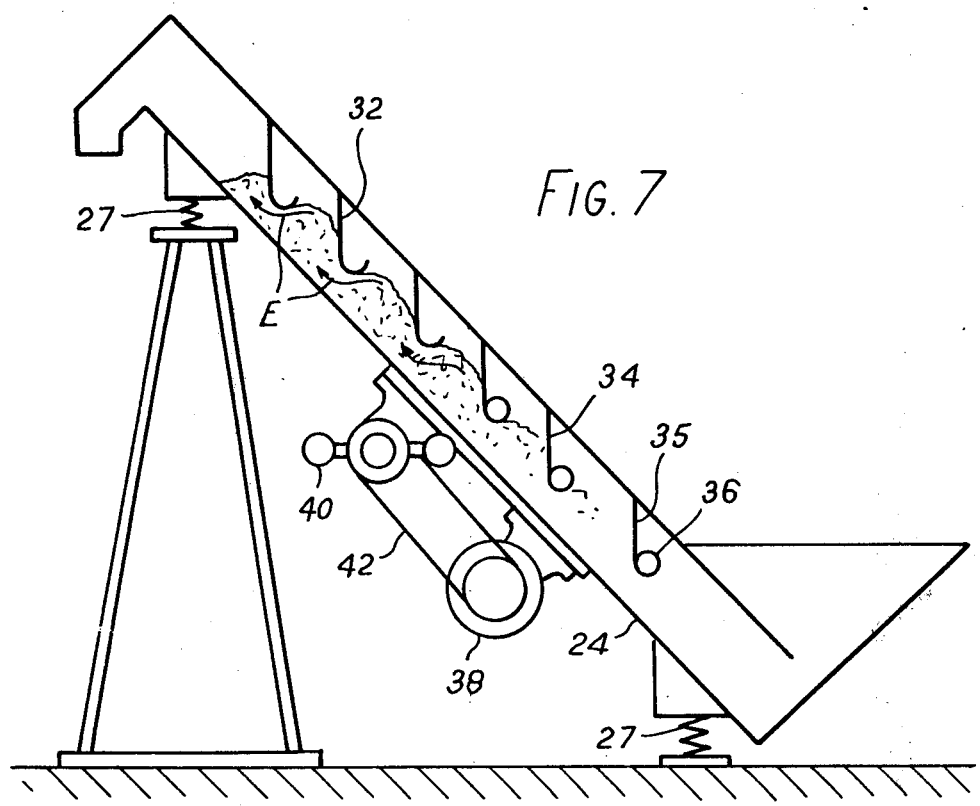
FIG. 7 is a diagrammatic side view of a vibratory elevator in accordance with another embodiment of the invention.

In the embodiment of the invention shown in FIG. 7 two types of baffle 32 and 34 are shown. The lower ends of the upper baffle set 32 are gently curved to assist the flow of particulate material around the base of the baffles in the manner shown by arrows E. The lower ends of the baffles 34 are curved also for a similar reason. However, the baffles 34 consist of a tube 36 to which a planar or curved support plate 38 is welded or otherwise secured, this arrangement being considered both simpler to manufacture and stronger than the curved baffles 32. Baffles 32 and 34 are secured between opposing walls 33 of the feeder and thus vibrate in unison with the inclined surface 24.

The vibrator utilized in the embodiment of FIG. 7 consists of a 3-phase squirrel cage electric motor 38 which is mounted on the inclined side wall 24 of the elevator and which drives out of balance weights 40 by a belt 42. If desired, the belt may include automatic belt tensioning.

It is to be understood that a variable speed drive may be used, for example by fitting a variable speed pulley either on the shaft of the driving motor or on the driven shaft. In this way the speed of vibration may be adjusted to be the most suitable for each different particulate material being conveyed.

As an alternative to utilising an electrical motor as the driving source, a pneumatic or hydraulic motor may be employed.

In the embodiment of the invention shown in FIG. 8, a cover 42 having an inlet port 44 for air provided in a lower region thereof and a further port 46 at an upper end thereof to enable dust or other unwanted fines to be removed. Thus, when handling chemically bonded particulate material, for example foundry sand, air is introduced through the port 44 and allowed to pass across th top of the baffles where it gathers unwanted fines of small particle sizing. Those fines are carried by the air current to a dust extractor (not shown) which is flexibly connected to the port 46. The baffles 30 of FIG. 8 are secured between the opposed walls 33 of the feeder and vibrate simultaneously with the inclined surface 24.

The embodiment of the invention shown in FIG. 9 enables particulate material to be heated and/or cooled during its passage up the vibratory elevator. The elevator includes a closed housing 48 across which heating or cooling elements 50 extend.

It will be apparent to those skilled in the art that various modifications and improvements may be resorted to without departing from the spirit and scope of the invention as defined in the appended claims.

I claim:

1. A vibratory elevator comprising a wall, structure on which said wall is mounted at an incline, an upper particulate material apparatus surface formed on said wall, a lower end of said wall defining a supply end of said surface, an upper end of said wall defining a discharge end of said surface, means resiliently mounting said wall on said structure, a plurality of baffles disposed in spaced apart relationship and above and spaced from said surface, said baffles being at acute angles respectively with respect to said surface in a direction of travel up the inclined surface and being transverse to said surface in said direction, and means for vibrating said wall to effect movement of a particulate material from said supply end to said discharge end being in the form of a layer of sufficient thickness to occupy a portion of said surface and said space between said baffles, said baffles being carried by said structure and said inclined surface is movable relative to said baffles and said structure.

2. A vibratory elevator as defined in claim 1 wherein said baffles are parallelly spaced apart.

3. A vibratory elevator as defined in claim 1 wherein said baffles are adjustably mounted to enable said acute angles to be adjusted.

4. A vibratory elevator as defined in claim 1 wherein a container is provided at the lower end of said elevator, said container having a false bottom in the form of a screen and a space below said false bottom for facilitating the feeding of particulate material to said suface.

5. A vibratory elevator comprising a wall, structure on which said wall is mounted at an incline, an upper particulate material apparatus surface formed on said wall, a lower end of said wall defining a supply end of said surface, an upper end of said wall defining a discharge end of said surface, means resiliently mounting said wall on said structure, a plurality of baffles disposed in spaced apart relationship and above and spaced from said surface, said baffles being at acute angles respectively with respect to said surface in a direction of travel up the inclined surface and being transverse to said surface in said direction, and means for vibrating said wall to effect movement of a particulate material from said supply end to said discharge end being in the form of a layer of sufficient thickness to occupy a portion of said surface and said space between said baffles, a housing enclosing said surface and said baffles, said housing including an air inlet port for enabling air to be introduced into the housing in an area above said baffles and an exit port enabling air entraining fine particles vibrated free from the particulate material to be removed from said housing.

* * * * *